US011231959B2

(12) United States Patent
Hu et al.

(10) Patent No.: US 11,231,959 B2
(45) Date of Patent: Jan. 25, 2022

(54) FOREGROUND AND BACKGROUND SWITCHING ENTRY GENERATION AND DISPLAY FOLLOWING QUIT OPERATIONS

(71) Applicant: Tencent Technology (Shenzhen) Company Limited, Shenzhen (CN)

(72) Inventors: Hao Jun Hu, Shenzhen (CN); Zong Zhuo Wu, Shenzhen (CN); Zhaowei Wang, Shenzhen (CN); Shang Tao Liang, Shenzhen (CN); Yi Duan, Shenzhen (CN); Xiao Kang Long, Shenzhen (CN); Chao Lin, Shenzhen (CN); Ji Sheng Huang, Shenzhen (CN); Qing Jie Lin, Shenzhen (CN); Hao Hu, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 336 days.

(21) Appl. No.: 16/418,520

(22) Filed: May 21, 2019

(65) Prior Publication Data
US 2019/0272193 A1 Sep. 5, 2019

Related U.S. Application Data

(63) Continuation of application No. PCT/CN2018/071267, filed on Jan. 4, 2018.

(30) Foreign Application Priority Data

Jan. 6, 2017 (CN) .......................... 201710011403.X

(51) Int. Cl.
*G06F 9/46* (2006.01)
*G06F 9/48* (2006.01)
(Continued)

(52) U.S. Cl.
CPC ............ *G06F 9/485* (2013.01); *G06F 9/4418* (2013.01); *G06F 9/44505* (2013.01); *G06F 9/451* (2018.02); *G06F 16/955* (2019.01)

(58) Field of Classification Search
CPC ........ G06F 9/485; G06F 9/451; G06F 9/4418; G06F 9/44505; G06F 16/955
(Continued)

(56) References Cited

U.S. PATENT DOCUMENTS

| 8,890,685 B1 * | 11/2014 | Sookman | G08B 25/008 340/539.13 |
| 2014/0075389 A1 | 3/2014 | Kim | |
| 2017/0357520 A1 * | 12/2017 | De Vries | G06F 3/0362 |

FOREIGN PATENT DOCUMENTS

| CN | 103324549 A | 9/2013 |
| CN | 103970598 A | 8/2014 |

(Continued)

OTHER PUBLICATIONS

English Translation of JP2015125567A (Year: 2015).*
(Continued)

*Primary Examiner* — Bradley A Teets
(74) *Attorney, Agent, or Firm* — Crowell & Moring LLP

(57) ABSTRACT

A system may detect a quit operation corresponding to a child application. In response to detection the quit operation, the system may store, in a memory, a mapping between the child application identifier and the child application task, and suspend display of the child application. The system may generate a foreground and background switching entry corresponding to the child application, the foreground and background switching entry associated with the child application identifier. The system may display the foreground and background switching entry in a visible region of the graphical user interface generated based on a parent application. The system may detect a selection operation indicative of
(Continued)

the foreground and background switching entry. In response to the selection operation, the system may obtain the child application task from the memory according to the child application identifier, and resume display of the child application based on the child application task.

20 Claims, 13 Drawing Sheets

(51) Int. Cl.
*G06F 9/451* (2018.01)
*G06F 9/4401* (2018.01)
*G06F 9/445* (2018.01)
*G06F 16/955* (2019.01)

(58) Field of Classification Search
USPC .......................................................... 718/100
See application file for complete search history.

(56) References Cited

FOREIGN PATENT DOCUMENTS

| | | |
|---|---|---|
| CN | 104035804 A | 9/2014 |
| CN | 104881212 A | 9/2015 |
| CN | 105487871 A | 4/2016 |
| CN | 105700776 A | 6/2016 |
| CN | 105786485 A | 7/2016 |
| CN | 106033372 A | 10/2016 |
| CN | 106095318 A | 11/2016 |
| CN | 106802803 A | 6/2017 |
| EP | 2 708 998 A2 | 3/2014 |
| EP | 2708998 A2 | 3/2014 |
| JP | 2014-071724 A | 4/2014 |
| JP | 2015-125567 A | 7/2015 |
| JP | 2016-015023 A | 1/2016 |
| KR | 2014-0035038 | 3/2014 |
| WO | WO 2018/127063 A1 | 7/2018 |

OTHER PUBLICATIONS

Office Action dated May 26, 2020 for Japanese Application No. 2019-531383 with English Translation, 5 pages.

International Search Report and Written Opinion, issued in International Application No. PCT/CN2018/071267, dated Apr. 4, 2018, pp. 1-13, State Intellectual Property Office of the P.R. China, Beijing, China.

Indian Examination Report for Application No. 201947019152 dated May 21, 2021 including translation (8 pages).

* cited by examiner

FOREGROUND AND BACKGROUND SWITCHING ENTRY GENERATION AND DISPLAY FOLLOWING QUIT OPERATIONS

CROSS REFERENCE TO RELATED APPLICATIONS

This application is a continuation of International Application PCT/CN2018/071267, filed Jan. 4, 2018, entitled APPLICATION DATA PROCESSING METHOD AND APPARATUS, AND STORAGE MEDIUM, which claims priority to Chinese Patent Application No. 201710011403.X, filed on Jan. 6, 2017, both of which are incorporated herein by reference in their entirety.

TECHNICAL FIELD

The present disclosure is related the field of computer technologies, and in particular, to application management and display.

BACKGROUND

With development of computer technologies, a user may install various application programs on a terminal. An application may present a page with various content viewable by the user. Traditional approaches for application management involve inefficient switching operations, lag time, and unresponsive application display.

SUMMARY

System and methods for application data processing are provided. By way of introductory example, a system may display, on a graphical user interface, content generated by a child application of a parent application. The system may detect a quit operation corresponding to a child application. In response to detection the quit operation, the system may obtain a child application identifier of the child application and a child application task corresponding to the child application identifier, store, in a memory, a mapping between the child application identifier and the child application task, and suspend display of the content generated by the child application. The system may generate a foreground and background switching entry corresponding to the child application. The foreground and background switching entry may be associated with the child application identifier. The system may display the foreground and background switching entry on a parent application region of the graphical user interface. The system may detect a selection operation indicative of selection of the foreground and background switching entry. In response to detection of the selection operation, the system may obtain the child application identifier associated with the foreground and background switching entry, obtain the child application task from the memory according to the child application identifier, and resume display of the content generated by the child application based on the child application task.

Additional or alternative examples, features, and technical advancements are provided in the system and methods described here.

BRIEF DESCRIPTION OF THE DRAWINGS

The embodiments may be better understood with reference to the following drawings and description. The components in the figures are not necessarily to scale. Moreover, in the figures, like-referenced numerals designate corresponding parts throughout the different views.

DETAILED DESCRIPTION

In some examples, a plurality of pages of an application program are directly closed when the application program is quitted. When the application program is opened again, a connected between the application program and a server is established again, to obtain page data of a page of the application program, and present the page of the application program, for example, present a home page of the application program. In this example, when the application program is opened again, a status of the application program when the application program is quitted last time cannot be quickly restored. For example, one or more pages presented before the application program is quitted cannot be quickly presented.

Figure 1:
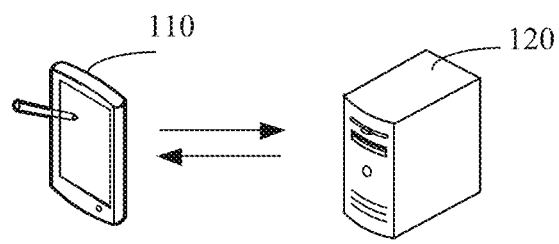
FIG. 1 is a diagram of an application environment of an application data processing method according to an embodiment.

To resolve the foregoing technical problem, embodiments of this application provide an application data processing method, system, and a storage medium. FIG. 1 is a diagram of an application environment of an application data processing method according to an embodiment. As shown in FIG. 1, the application environment includes a terminal 110 and a server 120. The terminal 110 communicates with the server 120 through a network.

The terminal 110 may be a smartphone, a tablet computer, a notebook computer, a desktop computer, or the like, but is not limited thereto. The terminal 110 may download a parent application from the server 120. The parent application may be provided with a child application data packet, or a data packet corresponding to a target child application may be downloaded from a page of the parent application as required. The parent application may be an application program that is run on an operating system. The parent application may communicate with the server through a network, and obtain data from the server, thereby providing a service to a user of the terminal 110. The parent application may provide an entry to an application program (referred to as a child application in the foregoing) outside a parent application, and run the child application in the parent application. In some examples, a parent application program is provided by the server 120, and child application programs may be respectively provided by a plurality of third-party devices. In this way, a parent application and a child application may be mutually independently developed, and the child application may be propagated on a platform provided by the parent application. For example, a parent application may be an instant messaging application or a social application; child applications may be various application programs that provide various services to work, life, and entertainment of a user, and may provide various services such as exchange rate query, dictionary, notes, agenda reminder, and take-out.

An application program is an encoded instruction sequence that may be performed by a terminal having an information processing capability, such as a computer, to obtain a result, or a symbolic instruction sequence or a symbolic statement sequence that may be automatically converted into an encoded instruction sequence.

An operating system is run on the terminal 110. A parent application is run on the operating system. The child application is entered by using the parent application, to display a child application page. A child application identifier of the child application and a corresponding child application task are stored in a main memory according to a quit instruction that acts on the child application, a foreground and background switching entry corresponding to the child application is generated, and the foreground and background switching entry is displayed on the parent application interface, so that the corresponding child application may be quickly switched to foreground according to an operation performed on the foreground and background switching entry, a corresponding status before quit may be restored according to the child application task stored in the main memory, and a page before the quit may be displayed. The child application identifier of the child application and the corresponding child application task are stored in the main memory after the quit, and this is equivalent to that the child application is run on background. Therefore, the corresponding child application task may be directly obtained from the main memory through the foreground and background switching entry, and a page status before the quit may be quickly restored according to page data in the child application task, implementing convenience and quickness.

Figure 2:
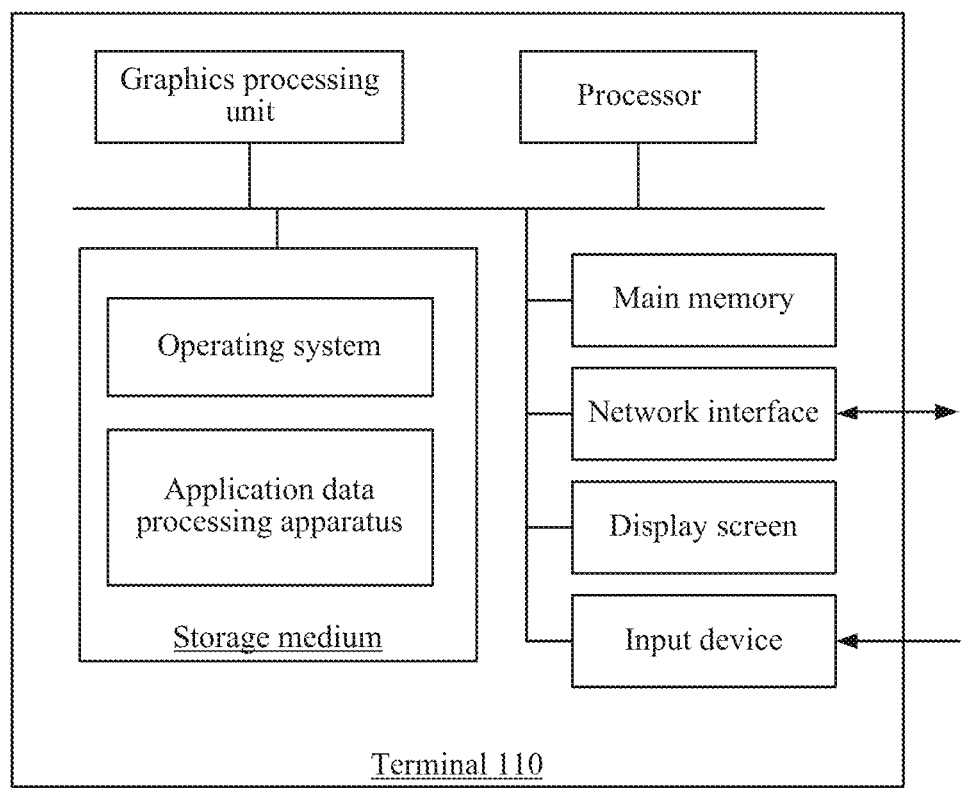
FIG. 2 is a diagram of an internal structure of a terminal in FIG. 1 according to an embodiment.

In an embodiment, as shown in the figure, an internal structure of the terminal 110 in FIG. 1 is shown in FIG. 2. The terminal 110 includes a processor, a graphics processing unit, a storage medium, a main memory, a network interface, a display screen, and an input device that are connected by using a system bus. The storage medium of the terminal 110 stores an operating system, and further includes an application data processing system. The system is configured to implement an application data processing method applicable to the terminal. The processor is configured to provide computing and control capabilities, to support running of the entire terminal 110. The graphics processing unit in the terminal 110 is configured to provide at least a drawing capability of a display interface, such as a child application page. The main memory provides an environment for running of the application data processing system in the storage medium. The network interface is configured to perform network communication with the server 120, for example, send a download request to the server 120. The display screen is configured to display an application interface, and the input device is configured to receive a command, data, or the like entered by a user. For a terminal 110 having a touchscreen, the display screen and the input device may be the touchscreen. The structure shown in FIG. 2 is merely a block diagram of a partial structure related to a solution in this application, and does not constitute a limitation to the terminal to which the solution in this application is applied. Specifically, the terminal may include more components or fewer components than those shown in the figure, or some components may be combined, or a different component deployment may be used.

Figure 3A:
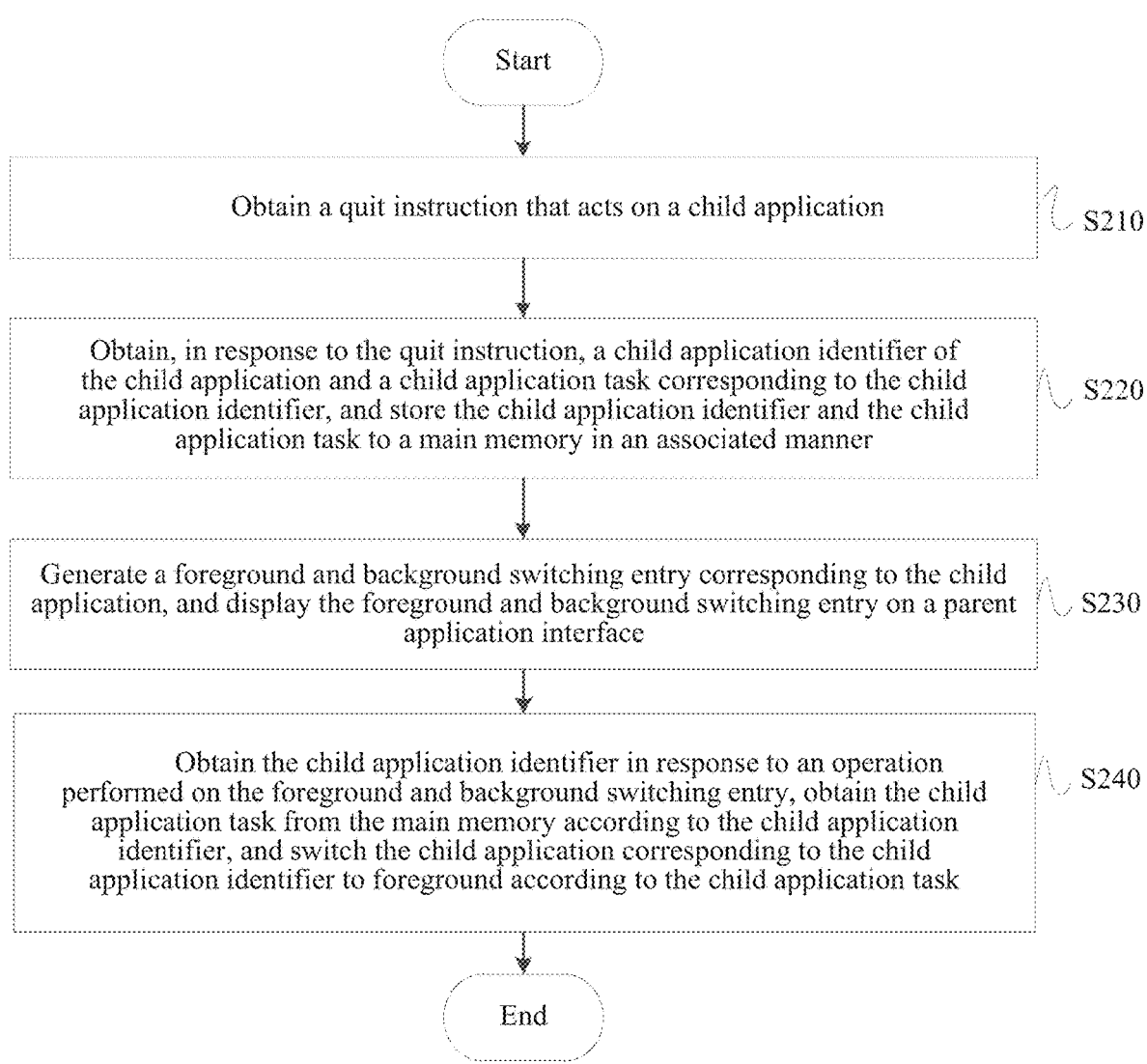
FIG. 3a is a flowchart of an application data processing method according to an embodiment.

In an embodiment, as shown in FIG. 3a, an application data processing method is provided. Descriptions are provided by using an example in which the method is applied to the terminal in the foregoing application environment. The method includes the following steps:

Step S210: Obtain a quit instruction that acts on a child application.

Figure 3B:
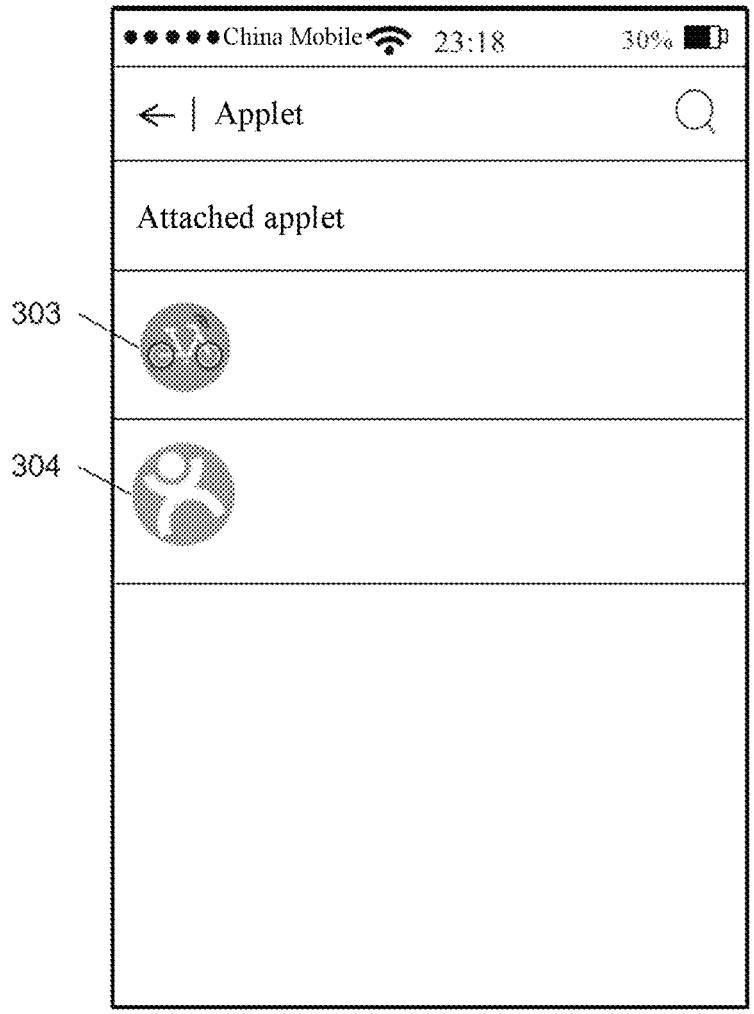
FIG. 3b is an interface diagram of a child application entry provided in a parent application according to an embodiment of this application.
Figure 3C:
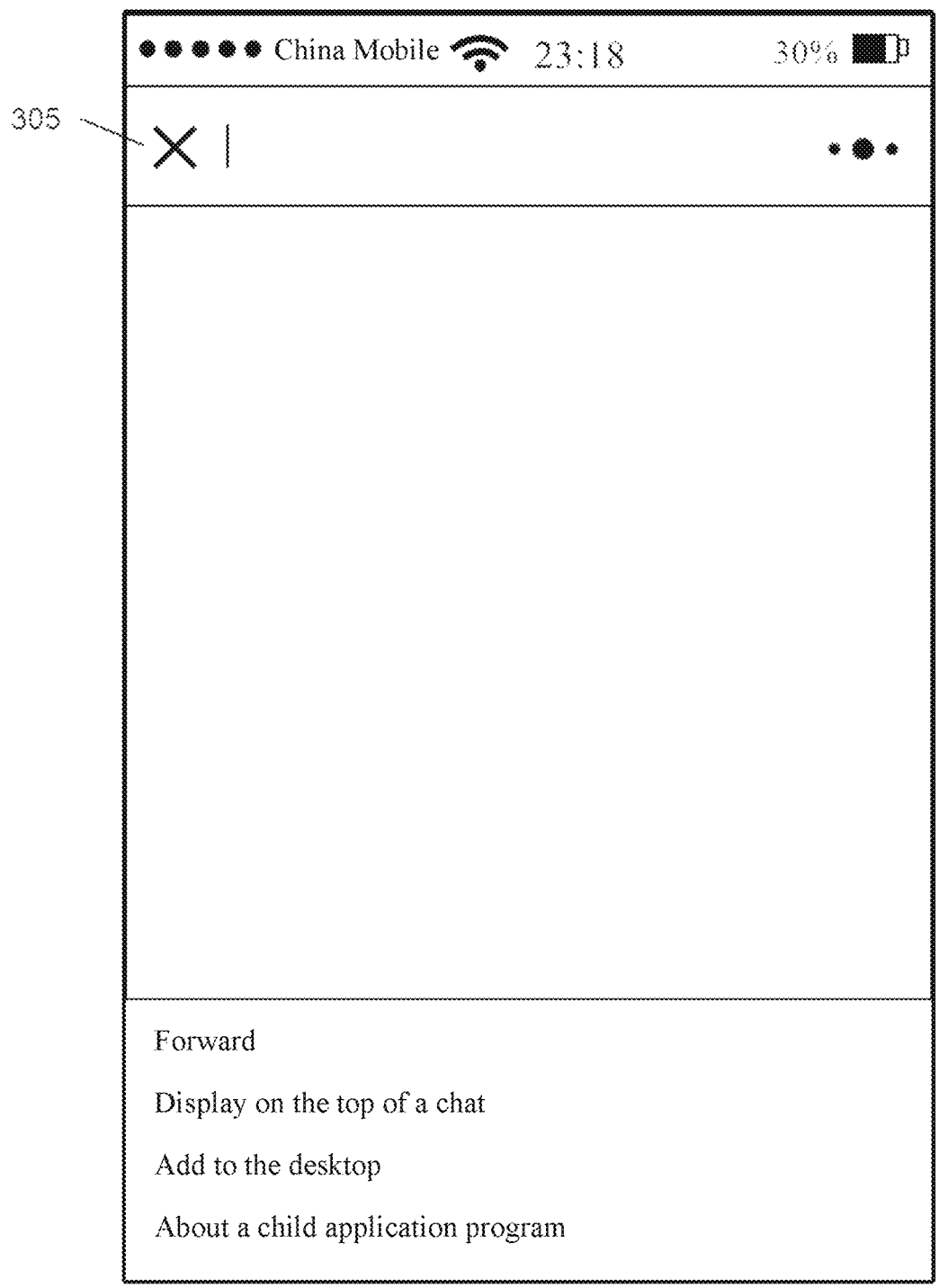
FIG. 3c is an interface diagram of a child application according to an embodiment of this application.

Specifically, the child application is an application program whose running depends on a parent application. A child application page is displayed in an environment provided by the parent application program. The child application may be downloaded, started, run, and closed by using the parent application. The parent application may be a social application, a dedicated application that specially supports the child application, a file management application, an email application, a game application, or the like. The social application includes an instant messaging application, a social network service (SNS), a live broadcast application, or an application that manages the allocation and use of computer resources to perform tasks of other or subservient applications. The child application is an application that can be implemented in the environment provided by the parent application. The child application may be specifically a social application, a file management application, an email application, a game application, or the like. For example, the parent application may be WeChat, and the child application may be an applet in WeChat, such as a Mobike applet, a Dianping applet, or the like. As shown in FIG. 3b, applet entries such as a Mobike applet entry 303 and a Dianping applet entry 304 are provided in WeChat. A corresponding applet may be entered by operating an applet entry, to present an applet interface shown in FIG. 3c. A quit instruction may be generated by an operation that acts on a virtual quit key of the child application, quit gesture presetting, or the like. For example, a user operates the virtual quit key 305, and the terminal obtains the quit instruction.

Step S220: Obtain a child application identifier of the child application and a corresponding child application task according to the quit instruction, and store the child application identifier and the child application task to a main memory, where the child application task includes child application page data.

When step S220 is performed, obtaining, in response to the quit instruction, the child application identifier of the child application and the child application task corresponding to the child application identifier, and storing the child application identifier and the child application task to the main memory in an associated manner is performed.

Specifically, in a process of running of each child application, a corresponding child application task exists. The child application task may include information related to the running of the child application, including child application page data in the process of the running of the child application. The page data is all data used for displaying a page, includes text information, picture information, video information, an event response component, and the like on the page, and may further include page running environment data, and page status data such as page display duration. The child application task may further include a child application running environment, task information, and the like. The task information is used for recording attribute information of the child application, including fixed attribute information and dynamic information that is generated in a running process, for example, information about an entry for entering the child application, running time information of the child application, priority information of the child application, and description information of the child application. The child application identifier of the child application and the corresponding child application task are stored in the main memory according to the quit instruction, and this is equivalent to that the child application is run on background. Running status data is reserved, so that the child application may be quickly switched to foreground by operating a foreground and background switching entry, to be run.

Step S230: Generate a foreground and background switching entry corresponding to the child application, and display the foreground and background switching entry on a parent application interface, where the foreground and background switching entry is used for quickly switching the corresponding child application to foreground and restoring a corresponding status before quit.

When step S230 is performed, generating a foreground and background switching entry corresponding to the child application, displaying the foreground and background switching entry on a parent application interface, obtaining the child application identifier in response to an operation performed on the foreground and background switching entry, and obtaining the child application task from the main memory according to the child application identifier is performed.

Specifically, the foreground and background switching entry corresponds to the child application. On the foreground and background switching entry, child application identifier information may be displayed. For example, a name, an icon, and the like of the child application may be displayed. A presentation location and a presentation manner of the foreground and background switching entry may be self-defined as required. For example, the foreground and background switching entry is presented above or on the top of the parent application interface. When there are a plurality of foreground and background switching entries, the foreground and background switching entries may be successively arranged and presented, or some foreground and background switching entries may be presented in a superimposition manner. The foreground and background switching entry may be fixed or movable, for example, is fixedly presented on a preset interface of the parent application, such as a communication information sending interface, or may be always presented on the top of different parent application interfaces as the parent application interfaces change.

S240: The foreground and background switching entry is used for obtaining the corresponding child application identifier, obtaining the corresponding child application task from the main memory according to the child application identifier, quickly switching the child application corresponding to the child application identifier to the foreground according to the child application task, and restoring a page status corresponding to the child application page data before the quit.

When step S240 is performed, obtaining the child application identifier in response to an operation performed on the foreground and background switching entry, obtaining the child application task from the main memory according to the child application identifier, and switching the child application corresponding to the child application identifier to foreground according to the child application task is performed.

The operation performed on the foreground and background switching entry is received, a restoration instruction of the corresponding child application is triggered according to the operation, and the child application identifier corresponding to the foreground and background switching entry is obtained. For example, in response to a click operation performed on a foreground and background switching entry on the parent application interface by a user, a child application identifier corresponding to the foreground and background switching entry is obtained. Because the child application identifier and the child application task are stored in the main memory in the associated manner, the child application task corresponding to the child application identifier is obtained according to the obtained child application identifier, so that the child application corresponding to the child application identifier is restored to the foreground according to the child application task, to be run.

In this embodiment, the quit instruction that acts on the child application is obtained, and the child application identifier of the child application and the corresponding child application task are stored to the main memory in response to the quit instruction. In addition, the foreground and background switching entry corresponding to the child application is generated, and the foreground and background switching entry is displayed on the parent application interface. The corresponding child application identifier is obtained in response to the operation performed on the foreground and background switching entry, the corresponding child application task is obtained from the main memory according to the child application identifier, and the child application is switched to the foreground according to the child application task, to be run. The child application identifier of the child application and the corresponding child application task are stored to the main memory in response to the quit instruction of the child application, and this is equivalent to that the child application is run on background, so that the child application may be quickly restored to the foreground according to the foreground and background switching entry, to be run. By using the foreground and background switching entry presented on the parent application interface, the status of the child application before the child application is quitted can be quickly restored, and the page presented before the child application is quitted can be quickly presented. By using this embodiment of this application, a processing resource of a CPU of the terminal can be saved, and a processing speed of the CPU can be increased.

Figure 4:
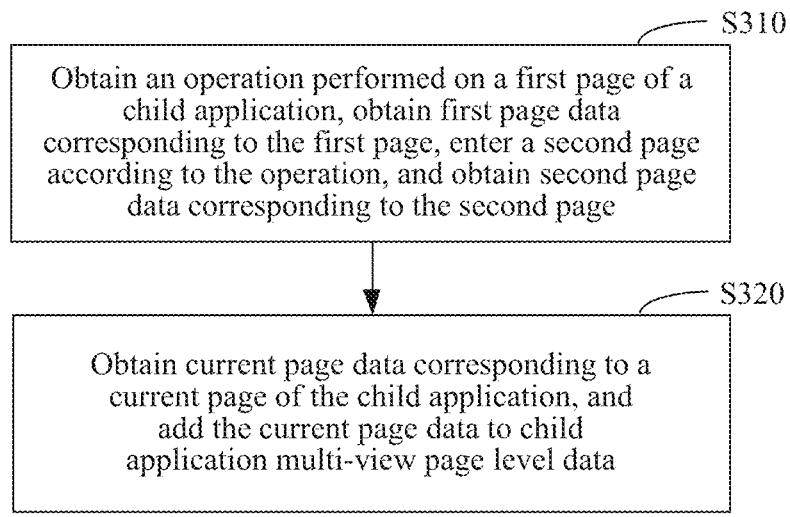
FIG. 4 is a flowchart of generating multi-view page level data according to an embodiment.

In an embodiment, the child application page data is child application multi-view page level data. As shown in FIG. 4, before step S210, the method further includes the following steps:

Step S310: Obtain an operation performed on a first page of a child application, obtain first page data corresponding to the first page, enter a second page according to the operation, and obtain second page data corresponding to the second page.

Specifically, the second page may be entered by using a virtual key or a link on the first page, and after the first page is entered, the first page data corresponding to the first page may begin to be obtained. The page data is all data used for displaying a page, includes text information, picture information, video information, an event response component, and the like on the page, and may further include page running environment data, and page status data such as page display duration. Information being constantly updated, such as display duration, may be obtained before the first page is quitted and the second page is entered. When different pages are entered, page data corresponding to the different pages are obtained.

Step S320: Generate child application multi-view page level data that has page chain relationship according to a page entering sequence. After step S210, the method further includes: obtaining current page data corresponding to a current page of the child application, and adding the current page data to the child application multi-view page level data, where top-level data of the child application multi-view page level data is the current page data.

Specifically, after a quit instruction is obtained on the current page, the current page data corresponding to the current page of the child application is obtained, and the page data of the current page is added to the child application multi-view page level data. In this way, the complete child application multi-view page level data corresponding to the child application is obtained. The top-level data of the child application multi-view page level data is the current page data. The top-level data is page data of a page before the child application is quitted, and is displayed when the child application is entered again next time. The child application multi-view page level data includes page data successively displayed in order of time and a chain relationship between pages. The child application multi-view page level data is used for recording page data corresponding to the child application since the child application is opened. The pages are stored on different levels in the child application multi-view page level data according to different display times. In an embodiment, a maximum quantity of levels may be self-defined. When a page quantity exceeds the maximum quantity of levels, page data displayed later is reserved in order of time, and page data displayed earlier expires, and is no longer recorded in the child application multi-view page level data. In an embodiment, a time threshold range may be self-defined. When a difference between a page time corresponding to first history page data and a current time interval exceeds the time threshold range, the first history page data is no longer recorded in the child application multi-view page level data. A condition is set to filter the child application multi-view page level data, so that it can be avoided that a large amount of data is stored to occupy the main memory.

In an embodiment, the child application task includes the child application page data, and before step S210, that is, before the obtaining a quit instruction that acts on a child application is performed, the application data processing method provided in this application further includes the following steps:

presenting a first page of the child application; obtaining page data of the first page in response to an operation performed on the first page, and adding the page data of the first page to the child application page data; and presenting a current second page of the child application in response to the operation performed on the first page; and after the obtaining a quit instruction that acts on a child application, the method further includes: obtaining page data of the second page, and adding the page data of the second page to the child application page data.

The terminal adds the page data of the first page to the child application page data in response to the operation performed on the first page, for example, an operation performed on the virtual key, the link, or the like, and in addition, present the current second page in response to the operation. If the terminal enters different pages, the terminal obtains page data corresponding to the different pages, and adds the page data of the pages to the child application page data when switching a page or quitting a page.

In some examples, the child application page data is child application multi-view page level data;

when the adding the page data of the first page to the child application page data is performed, the method includes the following step:

adding the page data of the first page to the child application multi-view page level data, to update the child application page data; and when the adding the page data of the second page to the child application page data is performed, the method includes the following step:

adding the page data of the second page to the child application multi-view page level data, to update the child application page data.

The child application page data is the child application multi-view page level data, and when a page is switched or a page is quitted, page data of the page is stored to the child application multi-view page level data. For example, the child application multi-view page level data is stack data, and when a page is switched or a page is quitted, page data of the page is placed into stack space to update the child application multi-view page level data. There is a chain relationship between page data stored in levels of the child application multi-view page level data. The chain relationship is a relationship that has a fixed sequence, for example, a first page->a second page. Only the first page may exist before the second page. Each page is a view page level, and different pages form different levels. Page data of a page that is first opened is stored in a bottom level of the child application multi-view page level data, and page data of a page that is opened is stored in a top level of the child application multi-view page level data. One piece of page data may be added to the top of the child application multi-view page level data by using a PUSH operation. When the child application is subsequently entered again through the foreground and background switching entry, one piece of page data may be inversely removed from the top of the child application multi-view page level data by using a POP operation, thereby displaying a current page according to the removed page data. When the child application multi-view page level data is stack data, a location of a stack pointer is adjusted when data is added to a stack or data is removed from a stack.

In this embodiment, the child application multi-view page level data is data that includes a chain relationship between levels of a plurality of pages, including data of a page before the page that is currently presented, so that forward restoration may be further performed according to an operation performed on the page that is currently presented. The child application multi-view page level data is continuous memory data, further improving browse convenience of a user. In addition, the child application multi-view page level data may be stored by using the stack. The stack is a storage part, and does not require an address to be provided for data writing and reading, but determines a reading sequence according to a writing sequence, increasing a speed of the data writing and reading.

Figure 5:
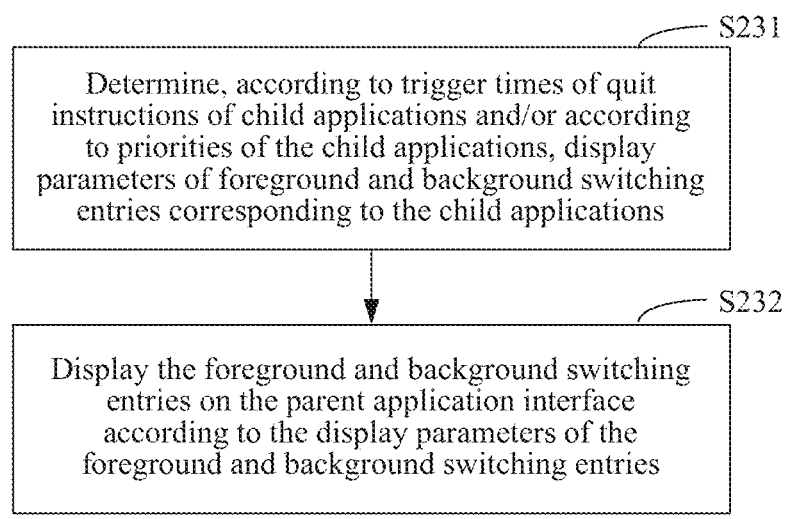
FIG. 5 is a flowchart of displaying a foreground and background switching entry according to an embodiment.

In an embodiment, there are a plurality of child applications, and the plurality of child applications correspond to a plurality of foreground and background switching entries, respectively corresponding to the child applications. In step S230, when the displaying the foreground and background switching entry on a parent application interface is performed, as shown in FIG. 5, the method includes the following steps:

Step S231: Determine, according to trigger times of quit instructions of child applications and/or according to priorities of the child applications, display parameters of foreground and background switching entries corresponding to the child applications.

Specifically, if a plurality of child applications are successively opened and then successively quitted within a period of time, a plurality of foreground and background switching entries are generated, and respectively correspond to the child applications. The display parameters may include a display size, a display location, and display dynamics, and the like. For example, a display location of a foreground and background switching entry may be adjusted according to quit times of the child applications or according to the priorities of the child applications. For example, for a child application that is quitted earlier, a foreground and background switching entry is displayed at an edge location of the interface, and a foreground and background switching entry corresponding to a child application having a high priority is displayed at a key location such as the center of the interface.

Step S232: Display the foreground and background switching entries on the parent application interface according to the display parameters of the foreground and background switching entries.

Figure 6:
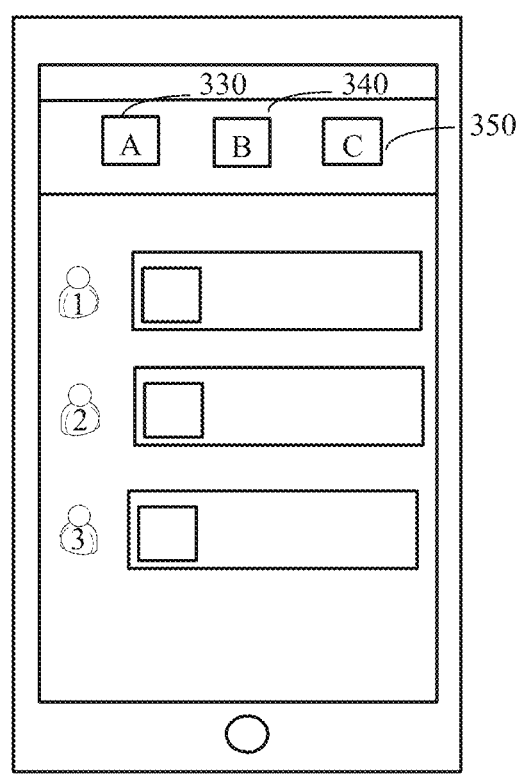
FIG. 6 is a schematic diagram of an interface for displaying a foreground and background switching entry according to an embodiment.

Specifically, when the foreground and background switching entries are displayed on the parent application interface according to the display parameters, the foreground and background switching entries may be presented on a preset interface of the parent application, or may be always presented on the top of different parent application interfaces as the parent application interfaces change. The preset interface may be self-defined. For example, in an embodiment, the preset interface is an instant session list interface. A display range of a foreground and background switching entry may be further self-defined, so that the foreground and background switching entry is displayed only within the display range, avoiding impact on browsing of a parent application interface. FIG. 6 is a schematic diagram of a foreground and background switching entry 330, a foreground and background switching entry 340, and a foreground and background switching entry 350 that correspond to a plurality of child applications displayed on a session list page of a parent application according to a specific embodiment.

In an embodiment, after step S230, the method further includes: obtaining a display time of the foreground and background switching entry, and if no operation performed on the foreground and background switching entry exists within a preset time threshold, closing the foreground and background switching entry, and clearing the child application task corresponding to the foreground and background switching entry from the main memory.

Specifically, if no operation performed on the foreground and background switching entry exists even if the display time of the foreground and background switching entry exceeds the preset time threshold, it indicates that a user probably does not require a child application corresponding to the foreground and background switching entry to be switched to the foreground, to be displayed. In this case, closing the foreground and background switching entry can prevent the user from entering the child application due to an incorrect operation on the foreground and background switching entry. In addition, clearing the child application task corresponding to the foreground and background switching entry from the main memory can save space of the main memory, and increase a program running speed.

Figure 7:
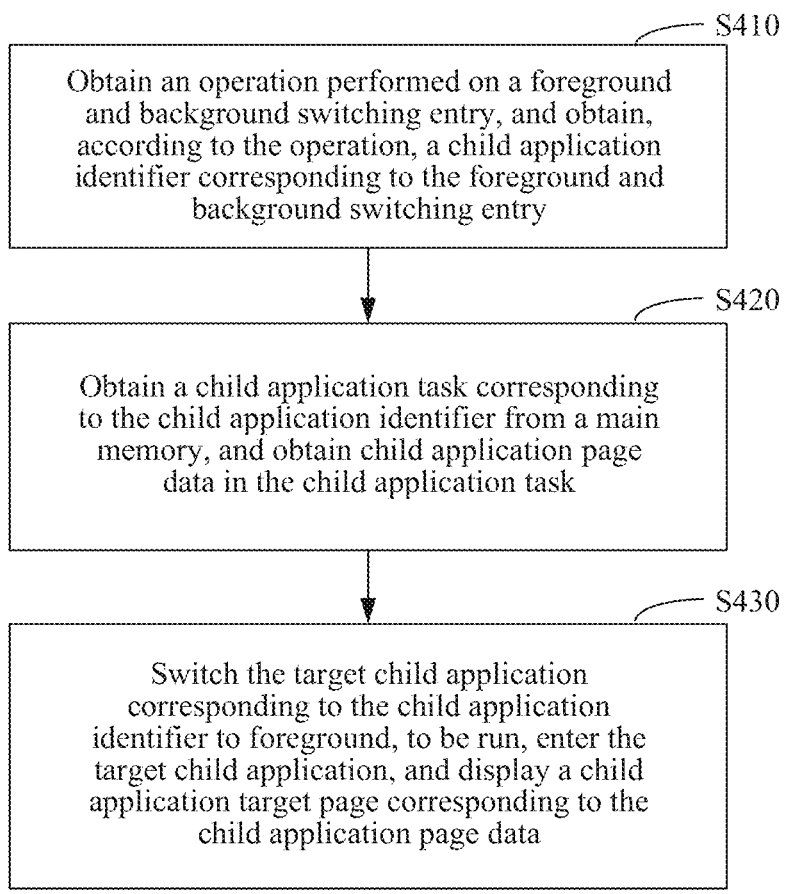
FIG. 7 is a flowchart of entering a child application through a foreground and background switching entry according to an embodiment.

In an embodiment, as shown in FIG. 7, after step S230, the method further includes the following steps:

Step S410: Obtain an operation performed on a foreground and background switching entry, and obtain, according to the operation, a child application identifier corresponding to the foreground and background switching entry.

Specifically, a child application identifier is used for uniquely identifying a child application. When there are a plurality of foreground and background switching entries, each foreground and background switching entry has a corresponding child application identifier, and any one of the plurality of foreground and background switching entries may be selected and switched to foreground, to be displayed. In an embodiment, a foreground and background switching entry is a view level component. A logical response event is bound to each view level component. A logical response event bound to the foreground and background switching entry is obtaining a child application identifier corresponding to the foreground and background switching entry, obtaining a corresponding child application task according to the child application identifier, switching a target child application corresponding to the child application identifier to the foreground, to be run, and restoring a running status of a child application before the child application is quitted.

Step S420: Obtain a child application task corresponding to the child application identifier from a main memory, and obtain child application page data in the child application task.

Specifically, the child application identifier and the child application task are stored in an associated manner in the main memory. The corresponding child application task is obtained by using the child application identifier. The child application task includes data for restoring the child application to a status before the child application is quitted, and the data includes the child application page data.

Step S430: Switch the target child application corresponding to the child application identifier to foreground, to be run, enter the target child application, and display a child application target page corresponding to the child application page data.

Specifically, if the child application task includes data of an environment in which the child application is run, the environment in which the child application is run may be directly restored according to the data of the environment, thereby switching the target child application corresponding to the child application identifier to the foreground, to be run, and entering the target child application. If the child application task does not include data of an environment in which the child application is run, the environment in which the child application is run may be newly established, and the target child application may be entered. The child application target page corresponding to the child application page data is displayed, and the child application is restored.

In an embodiment, the child application task includes child application page data. In step S240, when the quickly switching the child application corresponding to the child application identifier to the foreground according to the child application task is performed, the method includes the following step: presenting a page of the child application according to the child application page data.

Specifically, the child application identifier and the child application task are stored in an associated manner in the main memory. The corresponding child application task is obtained by using the child application identifier. The child application task includes child application page data. A page of the child application is presented according to the child application page data. For example, when the child application page data is page data of a page before the child application is quitted, the page before the child application is quitted is presented. When the child application page data includes page data of each of a plurality of pages that are opened before the child application is quitted, the plurality of pages before the child application is quitted are presented.

In some embodiments, the child application page data is child application multi-view page level data. When the presenting a page of the child application according to the child application page data is performed, the method includes the following step:

obtaining top-level data from the child application multi-view page level data, and displaying a child application page corresponding to the top-level data.

In this example, the child application page data is the child application multi-view page level data. For example, the child application multi-view page level data is stack data. When operating a foreground and background switching entry, a user obtains top-level page data from corresponding child application multi-view page level data, for example, obtains the top-level page data from the stack data, and presents the page of the child application according to the obtained page data. The top-level data in the child application multi-view page level data is page data of a page browsed before the child application is quitted. In this embodiment, through the operation performed on the foreground and background switching entry, a status of the corresponding child application before the child application is quitted may be quickly restored, and a page that is last browsed before the quit may be displayed. In an embodiment, the child application task further includes a JavaScript running environment and task information, and step S240 includes: obtaining the JavaScript running environment, and running a target child application corresponding to the child application identifier in the JavaScript running environment. The method further includes: updating the task information according to running of the target child application.

In this example, the child application task further includes running logic and the task information. In step S240, when the quickly switching the child application corresponding to the child application identifier to the foreground according to the child application task is performed, the method includes: running, according to the running logic, the child application corresponding to the child application identifier. The method further includes: updating the task information according to running of the child application.

Specifically, when each child application is run, a corresponding application service forms a JavaScript running environment. The JavaScript running environment is stored before the child application is quitted, so that a running environment of the child application can be quickly restored when the child application is entered again next time. If the child application task does not include data of an environment in which the child application is run, the environment in which the child application is run may be newly established. The environment in which the child application is run includes a running logic of the child application, and the child application is run according to the running logic. The task information is attribute information of the child application, including fixed information and dynamic information, such as a version number of the child application, an entry for entering the child application, and a running time of the child application. The task information is updated in a process of running of the target child application, so that the updated task information is conveniently and quickly stored when the child application is quitted. In an embodiment, the child application page data is child application multi-view page level data. In step S430, the step of displaying a child application target page corresponding to the child application page data includes: obtaining top-level data from the child application multi-view page level data, and displaying a child application page corresponding to the top-level data.

Specifically, the top-level data is obtained from the child application multi-view page level data. The top-level data is page data that is last browsed before the child application is quitted. In this way, target page data is obtained, the child application target page is displayed according to the target page data, and the status of the child application before the child application is quitted is restored.

Figure 8:
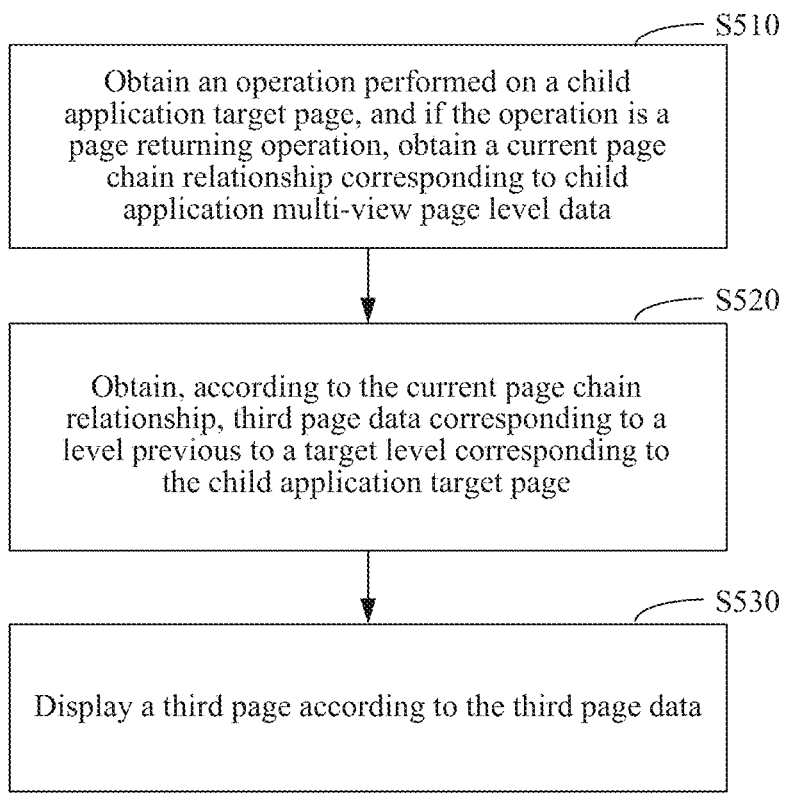
FIG. 8 is a schematic diagram of displaying a history page before a child application is quitted according to an embodiment.

In an example, as shown in FIG. 8, after step S430, the method further includes the following steps:

Step S510: Obtain an operation performed on a child application target page, and if the operation is a page returning operation, obtain a current page chain relationship corresponding to child application multi-view page level data.

Specifically, the returning operation is an operation of returning to a display page previous to the target page. The current page chain relationship records a sequence in which pages are successively opened, so that page data corresponding to the page previous to the target page may be obtained according to the current page chain relationship.

Step S520: Obtain, according to the current page chain relationship, third page data corresponding to a level previous to a target level corresponding to the child application target page.

Specifically, each page in the current page chain relationship is one level in level data, and sequentially forms level data of a plurality of levels. The obtained third page data corresponding to the level previous to the target level corresponding to the target page is the page data corresponding to the page previous to the target page.

Step S530: Display a third page according to the third page data.

Specifically, the third page displayed according to the third page data is the page previous to the target page before the target child application is quitted, so that one or more history browse pages may be successively returned to according to the multi-view page level data. In this way, a history browse page can be quickly opened.

The child application multi-view page level data is data that includes a chain relationship between levels of a plurality of pages, including data of a page before the page that is currently presented, so that forward restoration may be further performed according to an operation performed on the page that is currently presented. In this way, the history browse page can be quickly opened, and in addition, browse convenience of a user is improved.

In an example, according to the application data processing method provided in this application, after the presenting a page of the child application according to the child application page data is performed, the method further includes the following steps:

updating the child application multi-view page level data; and obtaining an operation performed on the child application page, and if the operation is a page returning operation, obtaining the top-level data in the child application multi-view page level data, and displaying the child application page corresponding to the top-level data.

When a page that is last browsed before the child application is quitted is presented according to the top-level data in the child application multi-view page level data, the child application multi-view page level data is updated. For example, when the child application multi-view page level data is stack data, a location of a pointer of a corresponding stack is updated, so that data of a lower level becomes top-level data in the stack data. In addition, when a returning operation is performed on the page of the child application, the returning operation is an operation of returning to a display page previous to the page. In this case, top-level data in the updated child application multi-view page level data is page data of a page previous to the presented child application page. In this case, the top-level data in the updated child application multi-view page level data is obtained, and the page previous to the current page according to the data.

In this example, the one or more history browse pages are successively returned to according to the multi-view page level data, so that a history browse page can be quickly opened.

Figure 9:
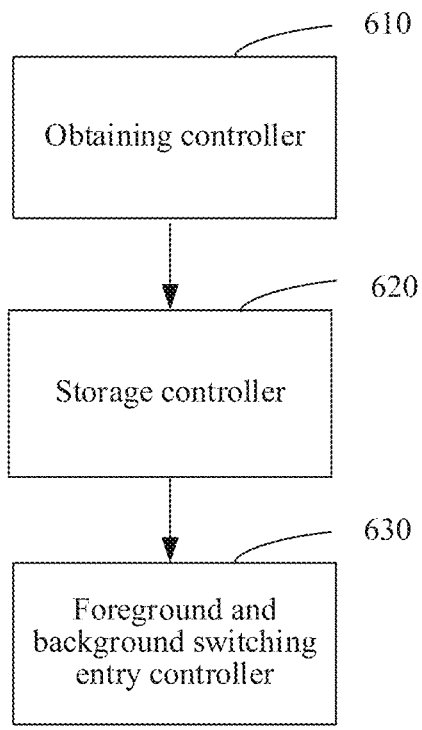
FIG. 9 is a structural block diagram of an application data processing system according to an embodiment.

In an embodiment, as shown in FIG. 9, an application data processing system is provided, including:

an obtaining controller 610, configured to obtain a quit instruction that acts on a child application;

a storage controller 620, configured to: obtain a child application identifier of the child application and a corresponding child application task according to the quit instruction, and store the child application identifier and the child application task to a main memory, where the child application task includes child application page data; and a foreground and background switching entry controller 630, configured to generate a foreground and background switching entry corresponding to the child application, and display the foreground and background switching entry on a parent application interface, where the foreground and background switching entry is used for obtaining the corresponding child application identifier, obtaining the corresponding child application task from the main memory according to the child application identifier, quickly switching the child application corresponding to the child application identifier to the foreground according to the child application task, and restoring a page status corresponding to the child application page data before the quit.

Figure 10:
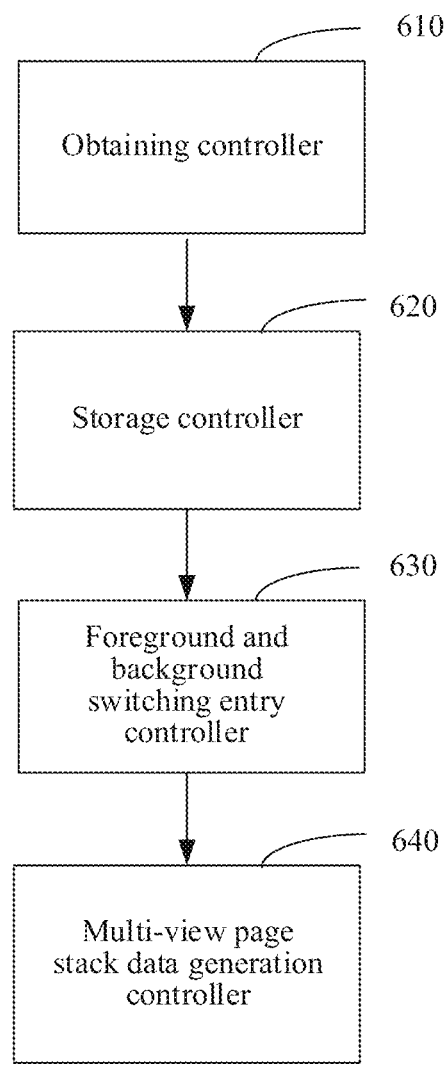
FIG. 10 is a structural block diagram of an application data processing system according to another embodiment.

In an embodiment, the child application page data is child application multi-view page level data. As shown in FIG. 10, the system further includes:

a multi-view page stack data generation controller 640, configured to: obtain an operation performed on a first page of a child application, obtain first page data corresponding to the first page, enter a second page according to the operation, obtain second page data corresponding to the second page, and generate history multi-view page stack data according to a page entering sequence.

The multi-view page stack data generation controller 640 is further configured to: obtain current page data corresponding to a current page of the child application, and add the current page data to a history page chain relationship, to generate current multi-view page stack data as the child application multi-view page level data. Top-level data of the child application multi-view page level data is the current page data.

Figure 11:
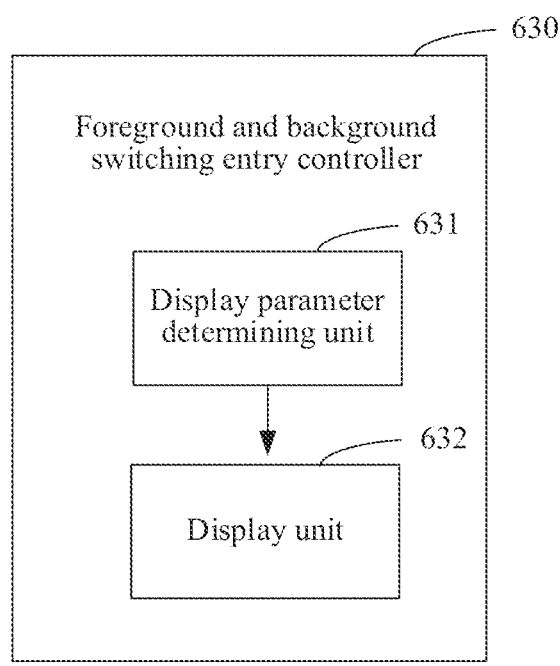
FIG. 11 is a structural block diagram of a foreground and background switching entry controller according to an embodiment.

In an embodiment, the child application corresponds to a plurality of foreground and background switching entries, respectively corresponding to child applications. As shown in FIG. 11, the foreground and background switching entry controller 630 includes:

a display parameter determining unit 631, configured to determine, according to trigger times of quit instructions of the child applications and/or according to priorities of the child applications, display parameters corresponding to the foreground and background switching entries; and a display unit 632, configured to display the foreground and background switching entries on a parent application interface according to the display parameters.

Figure 12:
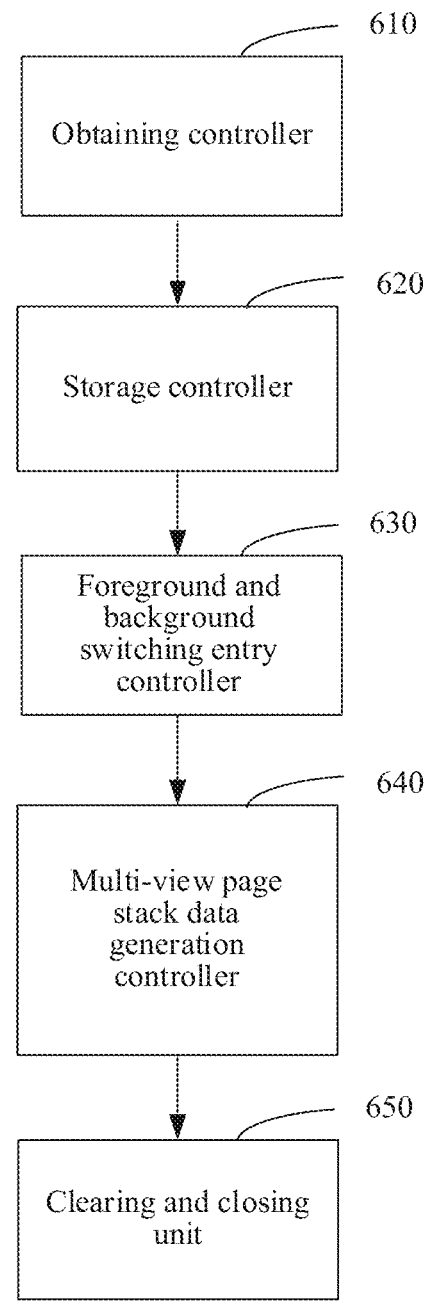
FIG. 12 is a structural block diagram of an application data processing system according to still another embodiment.

In an embodiment, as shown in FIG. 12, the system further includes:

a clearing and closing unit 650, configured to: obtain a display time of the foreground and background switching entry, and if no operation performed on the foreground and background switching entry exists within a preset time threshold, close the foreground and background switching entry, and clear the child application task corresponding to the foreground and background switching entry from the main memory.

Figure 13:
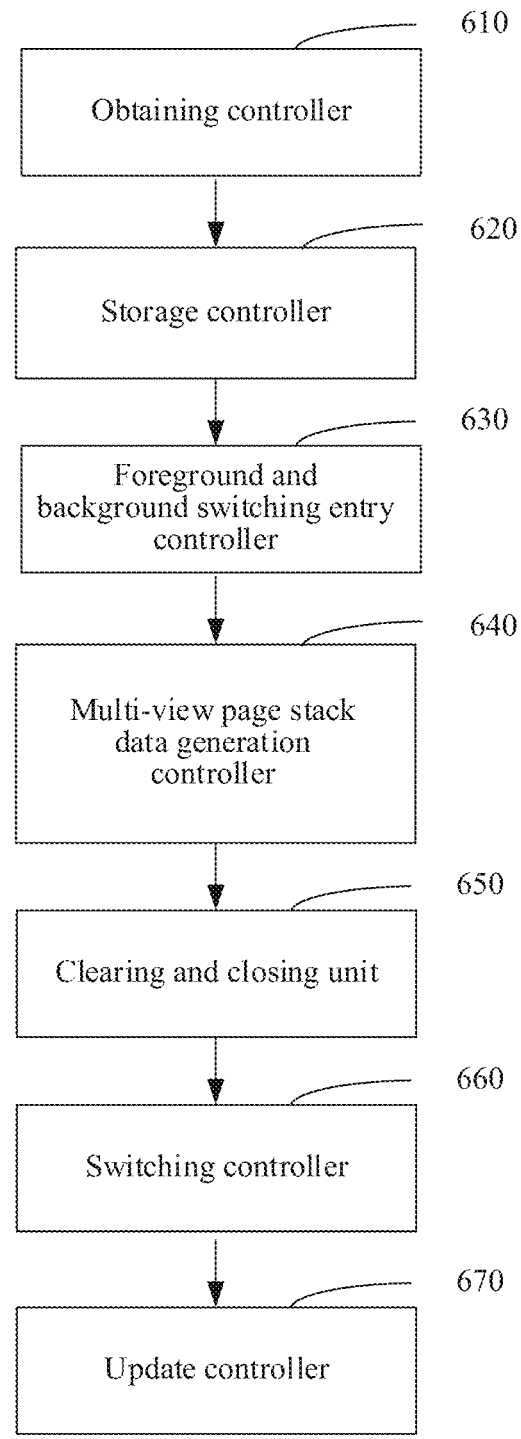
FIG. 13 is a structural block diagram of an application data processing system according to yet another embodiment.

In an embodiment, as shown in FIG. 13, the system further includes:

a switching controller 660, configured to: obtain an operation performed on a foreground and background switching entry, obtain, according to the operation, a child application identifier corresponding to the foreground and background switching entry, obtain a child application task corresponding to the child application identifier from a main memory, obtain child application page data in the child application task, switch a target child application corresponding to the child application identifier to foreground, to be run, enter the target child application, and display child application target page corresponding to the child application page data.

In an embodiment, the child application task further includes a JavaScript running environment and task information. The switching controller 660 is further configured to: obtain the JavaScript running environment, and run the target child application corresponding to the child application identifier in the JavaScript running environment.

The system further includes: an update controller 670, configured to update the task information according to running of the target child application.

In an embodiment, the child application page data is child application multi-view page level data. The switching controller 660 is further configured to: obtain top-level data from the child application multi-view page level data, and display a child application target page corresponding to the top-level data.

Figure 14:
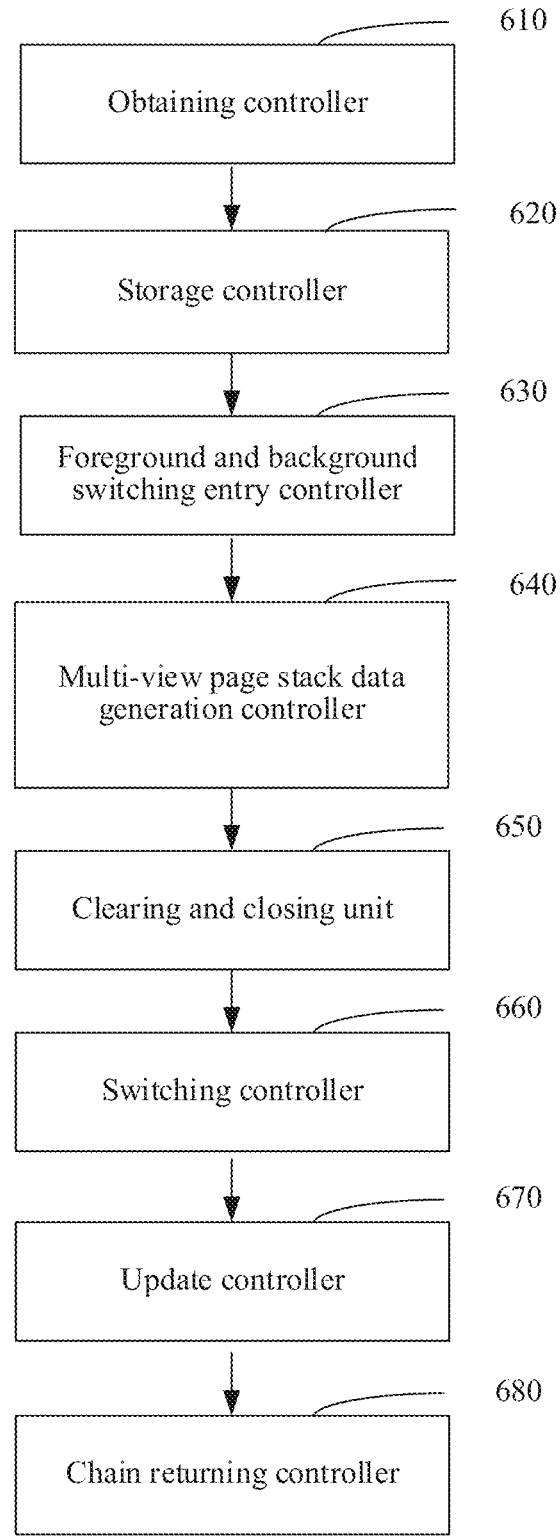
FIG. 14 is a structural block diagram of an application data processing system according to still yet another embodiment.

As shown in FIG. 14, the system further includes:

a chain returning controller 680, configured to: obtain an operation performed on a child application target page, and if the operation is a page returning operation, obtain a current page chain relationship corresponding to child application multi-view page level data, obtain, according to the current page chain relationship, third page data corresponding to a level previous to a target level corresponding to the child application target page, and display a third page according to the third page data.

In an example, the embodiments of this application further provide an application data processing system, including one or more processors and one or more memories. The one or more memories include computer-readable instructions, and the one or more processors are configured to execute the computer-readable instructions to implement the steps in the foregoing application data processing method in the foregoing embodiments, and functions of the controllers in the application data processing system in the foregoing embodiments.

Examples of the processor may include a general processor, a central processing unit, a microcontroller, a server, an application specific integrated circuit (ASIC), a digital signal processor, a field programmable gate array (FPGA), and/or a digital circuit, analog circuit, or some combination thereof. The processor may be one or more devices operable to execute logic. The logic may include computer executable instructions or computer code stored in the memory or in other memory that when executed by the processor, cause the processor to perform the features implemented by the logic of units, subunits, and/or logic described herein. The computer code may include instructions executable with the processor.

The memory may be any device for storing and retrieving data or any combination thereof. The memory may include non-volatile and/or volatile memory, such as a random access memory (RAM), a read-only memory (ROM), an erasable programmable read-only memory (EPROM), or flash memory. Alternatively or in addition, the memory may include an optical, magnetic (hard-drive) or any other form of data storage device. In some examples, the memory may include a non-transitory computer-readable storage medium includes a floppy disk, a hard disk, a magneto-optical disk, an optical memory, a magnetic tape, a non-volatile storage card, and a ROM. Optionally, program code may be downloaded form a server computer through a communications network.

An embodiment of this application further provides a non-volatile computer readable storage medium storing a computer readable instruction that enables at least one processor to perform the method according to the foregoing embodiments.

A person of ordinary skill in the art may understand that all or some of the processes of the methods in the embodiments may be implemented by a computer program instructing relevant hardware. The program may be stored in a computer readable storage medium. For example, in the embodiments of the present disclosure, the program may be stored in a storage medium of a computer system, and executed by at least one processor in the computer system, to include the processes of the embodiments of the foregoing methods. The foregoing storage medium may be a magnetic disk, an optical disc, a read-only memory (ROM), or a random access memory (RAM). Alternatively or in addition, the units, subunits, controllers, and/or logic described herein may be referred to as a logical component. Each logical component may be hardware or a combination of hardware and software. For example, each logical component may include an application specific integrated circuit (ASIC), a Field Programmable Gate Array (FPGA), a digital logic circuit, an analog circuit, a combination of discrete circuits, gates, or any other type of hardware or combination thereof. Alternatively or in addition, each logical component may include memory hardware, such as a portion of the memory, for example, that comprises instructions executable with the processor or other processors to implement one or more of the features of the logical components. When any one of the logical components includes the portion of the memory that comprises instructions executable with the processor, the logical component may or may not include the processor. In some examples, each logical components may just be the portion of the memory or other physical memory that comprises instructions executable with the processor or other processor to implement the features of the corresponding logical component without the logical component including any other hardware. Because each logical component includes at least some hardware even when the included hardware comprises software, each logical component may be interchangeably referred to as a hardware logical component.

A second action may be said to be "in response to" a first action independent of whether the second action results directly or indirectly from the first action. The second action may occur at a substantially later time than the first action and still be in response to the first action. Similarly, the second action may be said to be in response to the first action even if intervening actions take place between the first action and the second action, and even if one or more of the intervening actions directly cause the second action to be performed. For example, a second action may be in response to a first action if the first action sets a flag and a third action later initiates the second action whenever the flag is set.

To clarify the use of and to hereby provide notice to the public, the phrases "at least one of <A>, <B>, . . . and <N>" or "at least one of <A>, <B>, . . . <N>, or combinations thereof" or "<A>, <B>, . . . and/or <N>" are defined by the Applicant in the broadest sense, superseding any other implied definitions hereinbefore or hereinafter unless expressly asserted by the Applicant to the contrary, to mean one or more elements selected from the group comprising A, B, . . . and N. In other words, the phrases mean any combination of one or more of the elements A, B, . . . or N including any one element alone or the one element in combination with one or more of the other elements which may also include, in combination, additional elements not listed.

While various embodiments have been described, it will be apparent to those of ordinary skill in the art that many more embodiments and implementations are possible. Accordingly, the embodiments described herein are examples, not the only possible embodiments and implementations.

What is claimed is:

1. A method comprising:
   displaying, on a graphical user interface, content generated by a child application of a parent application;
   detecting a quit operation corresponding to a child application;
   in response to detecting the quit operation:
   obtaining a child application identifier of the child application and a child application task corresponding to the child application identifier,
   storing, in a memory, a mapping between the child application identifier and the child application task, and hiding the content generated by the child application;
   generating a foreground and background switching entry corresponding to the child application, the foreground and background switching entry associated with the child application identifier and configured to resume display of the content generated by the child application in response to being selected;

displaying the foreground and background switching entry on a parent application region of the graphical user interface;

detecting a selection operation indicative of selection of the foreground and background switching entry;

in response to detecting the selection operation:
  obtaining the child application identifier associated with the foreground and background switching entry,
  obtaining the child application task from the memory according to the child application identifier, and
  resuming display of the content generated by the child application based on the child application task; and in response to determining no operation is performed on the foreground and background switching entry within a preset time threshold from a display time of the foreground and background switching entry, closing the foreground and background switching entry.

2. The method of claim 1, wherein the child application task comprises child application page data, wherein before detecting the quit operation corresponding to a child application, the method further comprises:
  displaying a first page of the child application;
  obtaining page data of the first page in response to an operation performed on the first page;
  including the page data of the first page in the child application page data; and displaying a second page of the child application in response to the operation performed on the first page, and
  wherein after detecting the quit operation corresponding to a child application, the method further comprises:
    obtaining page data of the second page; and
    including the page data of the second page in the child application page data.

3. The method of claim 2, wherein the child application page data comprises child application multi-view page level data,
  wherein including the page data of the first page in the child application page data further comprises including the page data of the first page to the child application multi-view page level data to update the child application page data; and
  wherein including the page data of the second page in the child application page data further comprises including the page data of the second page to the child application multi-view page level data to update the child application page data.

4. The method of claim 1, wherein the parent application includes a plurality of child applications, the plurality of child applications corresponding to a plurality of foreground and background switching entries, respectively, wherein displaying the foreground and background switching entry further comprises:
  determining, based on trigger times of quit operations of the child applications, priorities of the child application, or any combination thereof, display parameters of the foreground and background switching entries; and
  displaying, on the graphical user interface, the foreground and background switching entries based on the display parameters of the foreground and background switching entries.

5. The method of claim 1,
  further in response to determining no operation is performed on the foreground and background switching entry within the preset time threshold,
  deleting the mapping between the child application identifier and the child application task from the memory.

6. The method of claim 1, wherein the child application task comprises child application page data, wherein resuming display of the content generated by the child application based on the child application task further comprises:
  displaying a page of the child application based on the child application page data.

7. The method of claim 6, wherein the child application page data includes child application multi-view page level data, and wherein displaying the page of the child application based on the child application page data further comprises:
  obtaining top-level data from the child application multi-view page level data; and
  displaying a child application page corresponding to the top-level data.

8. The method of claim 7, further comprising:
  updating the child application multi-view page level data;
  obtaining an operation performed on the child application page; and
  in response to the operation being a page returning operation:
    obtaining the top-level data in the child application multi-view page level data, and
    displaying the child application page corresponding to the top-level data.

9. The method of claim 1, wherein the child application task further comprises executable logic and task information, wherein resuming display of the content generated by the child application based on the child application task comprises:
  executing, based on the executable logic, the child application corresponding to the child application identifier, and
  wherein the method further comprises updating task information of the child application task based on execution of the child application.

10. A system comprising:
a processor, the processor configured to:
  display, on a graphical user interface, content generated by a child application of a parent application;
  detect a quit operation corresponding to a child application;
  in response to detection the quit operation:
    obtain a child application identifier of the child application and a child application task corresponding to the child application identifier,
    store, in a memory, a mapping between the child application identifier and the child application task, and
    suspend display of the content generated by the child application;
  generate a foreground and background switching entry corresponding to the child application, the foreground and background switching entry associated with the child application identifier and configured to resume display of the content generated by the child application in response to being selected;
  display the foreground and background switching entry on a parent application region of the graphical user interface;
  detect a selection operation indicative of selection of the foreground and background switching entry;

in response to detection of the selection operation:
    obtain the child application identifier associated with the foreground and background switching entry,
    obtain the child application task from the memory according to the child application identifier, and
    resume display of the content generated by the child application based on the child application task; and
in response to a determination that no operation is performed on the foreground and background switching entry within a preset time threshold from a display time of the foreground and background switching entry, close the foreground and background switching entry.

11. The system of claim 10, wherein the child application task comprises child application page data, wherein before detection of the quit operation corresponding to a child application, the processor is further configured to:
display a first page of the child application;
obtain page data of the first page in response to an operation performed on the first page;
include the page data of the first page in the child application page data; and
display a second page of the child application in response to the operation performed on the first page, and
wherein after detection of the quit operation corresponding to a child application, the processor is further configured to:
    obtain page data of the second page; and
    include the page data of the second page in the child application page data.

12. The system of claim 11, wherein the child application page data comprises child application multi-view page level data,
wherein to include the page data of the first page in the child application page data, the processor is further configured to include the page data of the first page to the child application multi-view page level data to update the child application page data, and
wherein to include the page data of the second page in the child application page data, the processor is further configured to include the page data of the second page in the child application multi-view page level data to update the child application page data.

13. The system of claim 10, wherein the parent application includes a plurality of child applications, the plurality of child applications corresponding to a plurality of foreground and background switching entries, respectively, wherein to display the foreground and background switching entry, the processor is further configured to:
determine, based on trigger times of quit operations of the child applications, priorities of the child application, or any combination thereof, display parameters of the foreground and background switching entries; and
display, on the graphical user interface, the foreground and background switching entries based on the display parameters of the foreground and background switching entries.

14. The system of claim 10, wherein the processor is further configured to:
in response to the determination that no operation is performed on the foreground and background switching entry within the preset time threshold, delete the mapping between the child application identifier and the child application task from the memory.

15. The system of claim 10, wherein the child application task comprises child application page data, wherein to resume execution of the child application based on the child application task, the processor is further configured to:
display a page of the child application based on the child application page data.

16. The system of claim 15, wherein the child application page data comprises child application multi-view page level data, and to display the page of the child application based on the child application page data, the processor is further configured to:
obtain top-level data from the child application multi-view page level data; and
display a child application page corresponding to the top-level data.

17. The system of claim 16, wherein the processor is further configured to:
update the child application multi-view page level data;
obtain an operation performed on the child application page; and
in response to the operation being a page returning operation:
    obtain the top-level data in the child application multi-view page level data, and display the child application page corresponding to the top-level data.

18. The system of claim 10, wherein the child application task further comprises executable logic and task information, wherein to resume display of the content generated by the child application based on the child application task, the processor is further configured to:
execute, based on the executable logic, the child application corresponding to the child application identifier, and
update task information of the child application task based on execution of the child application.

19. A non-transitory computer readable storage medium, comprising
a plurality of instructions executable by a processor, wherein execution of the instructions cause the processor to:
display, on a graphical user interface, content generated by a child application of a parent application;
detect a quit operation corresponding to a child application;
in response to detection the quit operation:
    obtain a child application identifier of the child application and a child application task corresponding to the child application identifier,
    store a mapping between the child application identifier and the child application task, and
    suspend display of the content generated by the child application;
generate a foreground and background switching entry corresponding to the child application, the foreground and background switching entry associated with the child application identifier and configured to resume display of the content generated by the child application in response to being selected;
display the foreground and background switching entry on a parent application region of the graphical user interface;
detect a selection operation indicative of selection of the foreground and background switching entry;
in response to detection of the selection operation:
    obtain the child application identifier associated with the foreground and background switching entry,
    obtain the child application task from according to the child application identifier, and resume display of the content generated by the child application based on the child application task; and in response to a determination that no operation is performed on the foreground and background switching entry within a preset time threshold from a display time of the foreground and background switching entry, close the foreground and background switching entry.

20. The non-transitory computer readable storage medium of claim 19, wherein the child application task comprises child application page data, wherein before detection of the quit operation corresponding to a child application, the instructions further cause the processor to:

display a first page of the child application;

obtain page data of the first page in response to an operation performed on the first page;

include the page data of the first page in the child application page data; and display a second page of the child application in response to the operation performed on the first page, and wherein after detection of the quit operation corresponding to a child application, the instructions further cause the processor to:

obtain page data of the second page; and include the page data of the second page in the child application page data.

* * * * *